United States Patent [19]
Figueroa et al.

[11] 3,894,221
[45] July 8, 1975

[54] SPEED UP CIRCUIT IN AN APPARATUS FOR MEASURING A DIVIDING PARTICLE SIZE OF A PARTICULATE SYSTEM

[75] Inventors: David R. Figueroa, Pembroke Pines; Edward Neal Doty, Pompano Beach; Anthony Marino, Plantation, all of Fla.

[73] Assignee: Coulter Electronics, Inc., Hialeah, Fla.

[22] Filed: Mar. 1, 1974

[21] Appl. No.: 447,264

[52] U.S. Cl............. 235/151.3; 235/92 M; 324/71; 235/92 PC
[51] Int. Cl......................... G06g 7/12; G01n 27/00
[58] Field of Search............ 235/151.3, 92 M, 184; 324/71; 250/218

[56] References Cited
UNITED STATES PATENTS

| | | |
|---|---|---|
| 3,127,505 | 3/1964 | Gustavson............................ 235/92 |
| 3,271,672 | 9/1966 | Henderson......................... 235/92 X |
| 3,331,950 | 7/1967 | Coulter et al........................ 235/92 |
| 3,377,597 | 4/1968 | Muta............................ 235/151.3 X |
| 3,392,331 | 7/1968 | Coulter............................ 235/92 X |
| 3,444,463 | 5/1969 | Coulter et al..................... 235/92 X |

Primary Examiner—Malcolm A. Morrison
Assistant Examiner—Edward J. Wise
Attorney, Agent, or Firm—Silverman & Cass, Ltd.

[57] ABSTRACT

A speed-up circuit in an apparatus for measuring a dividing particle size of a particulate system operates to give greater weight to the particle size of particles sensed shortly after system initiation as compared to particles sensed a substantial period of time after system initiation. This increases the speed at which the system moves from an initial or reference setting towards the desired particle size above and below which size predetermined fractions of the total mass of the particulate system are respectively included.

26 Claims, 6 Drawing Figures

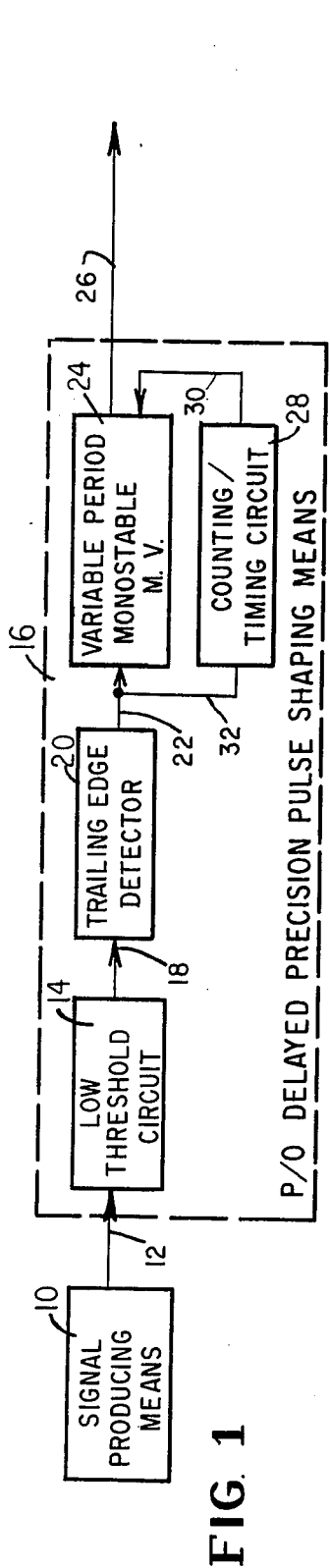
FIG. 1
FIG. 3
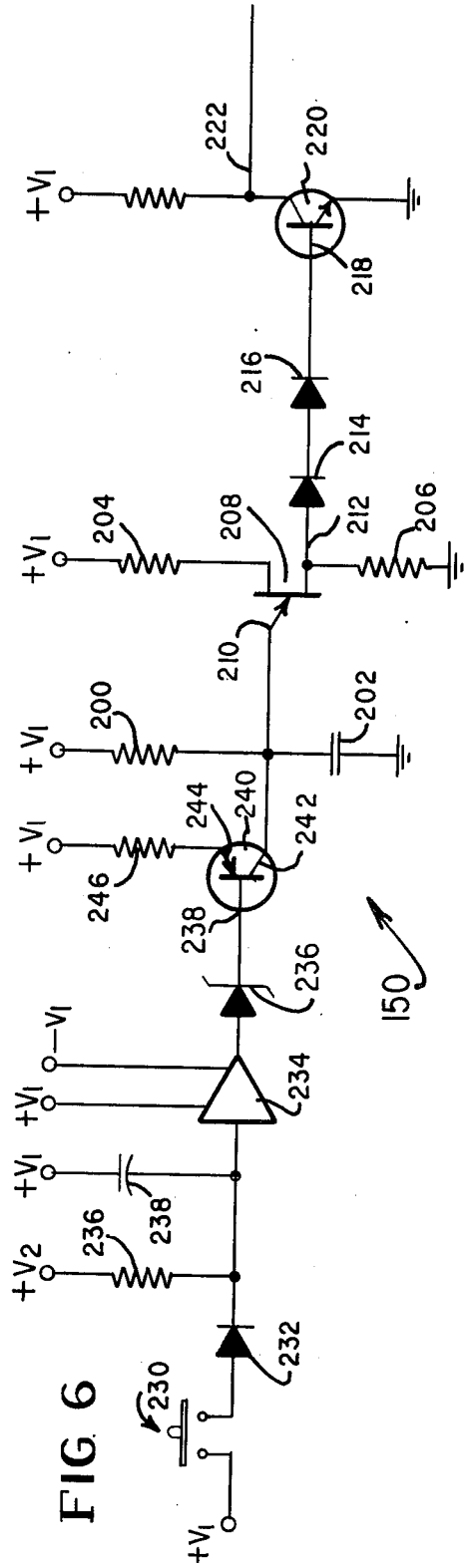
FIG. 6

SPEED UP CIRCUIT IN AN APPARATUS FOR MEASURING A DIVIDING PARTICLE SIZE OF A PARTICULATE SYSTEM

CROSS REFERENCE TO RELATED APPLICATIONS

This application is related to U.S. Pat. No. 3,557,352 entitled "Apparatus and Method for Measuring a Dividing Particle Size of a Particulate System", which patent is hereby incorporated by reference into this application.

BACKGROUND OF THE INVENTION

In the apparatus identified in the above noted patent, the particles in a particulate system are passed through a Coulter type apparatus. Each particle causes a particle pulse to be developed whose amplitude is proportional to the size of the particle producing it. The particle pulses are changed into representative electrical quantities, such as charges, which are proportional to the pulse amplitudes and hence, the respective size of the particles themselves. These electrical quantities or charges are passed via either one of two channels to an accumulating circuit associated with that channel. The accumulating circuit builds up a charge proportional to the total number of charges coupled thereto. A threshold circuit which discriminates between particle pulses produced by particles above and below a particular selected size causes the charges to be coupled to one or the other of the two channels and its respective accumulating circuit. The threshold level of the threshold circuit is changed either manually or electrically until the two accumulated amounts of charges have a desired relationship, for example one being equal to the other. When they are equal, the total mass of particles producing the level of charge in the one accumulating circuit is equal to the total mass of particles producing the same level of charge in the other accumulating circuit. In a practical apparatus the threshold level used to obtain a state of equality between the accumulating circuits is related to the mass median particle size, as defined in the above noted patent, or any other chosen dividing size.

When the apparatus operation is initiated, there is no charge in either one of the two accumulating circuits. This, of course, would indicate a dividing size of zero. As the charges accumulate, the dividing size starts moving away from the starting point towards that desired dividing size above and below which size predetermined fractions of the total mass of the system are included. If the time constants determining the speed at which the accumulators charging and the movement away from the starting point are made small, the total time necessary to ascertain the dividing size of the particulate system is small, thus increasing the number of tests which can be performed in a period of time and the usefulness of the apparatus. However, small time constants permit random fluctuation about the true dividing size once equilibrium is reached. The present invention permits variable time constants to achieve to the fast acquisition of equilibrium and minimal fluctuations about the true dividing size.

The above noted apparatus is designed to detect particles in a particulate system which differ substantially in size. This is accomplished by providing a number of range circuits within the apparatus each for a different range of particle sizes. Each range circuit must be carefully designed and correlated with all other range circuits so as to prevent any undesired overlap in operation. If speed-up circuits are provided, the speed-up circuit for each range circuit must be precisely adjusted with respect to the speed-up circuits for every other range circuit in order to prevent any overlaps in operation.

SUMMARY OF THE INVENTION

An apparatus is provided for ascertaining that particle dividing size within a particulate system, above and below which dividing size predetermined fractions of the total mass of the system are respectively included. The apparatus is operative to move the particles within the particulate system relative to a sensing device which responds to movement of individual particles to produce electrical changes in the apparatus which are proportional respectively to the size of the individual particles moved relative to the sensing device. These electrical changes are used by the apparatus in order to ascertain that particle dividing size above and below which size predetermined fractions of the total mass of the system are respectively included. The apparatus includes a speed-up circuit which is operative to vary, in a predetermined manner, the proportional relationship between the electrical changes in the apparatus and the individual particles size for increasing the speed at which the particle dividing size is ascertained.

In one embodiment, the apparatus includes a threshold circuit. The threshold circuit will develop a threshold pulse in response to passage, relative to the sensing means, of each particle in the particulate system in excess of a particular size. The speed-up circuit in this embodiment includes a first circuit which is operative in response to each threshold pulse to develop an output signal of fixed amplitude and predetermined duration. A second circuit is coupled to the first circuit and is operative either in response to the number of threshold pulses received, or the period during which the threshold pulses are received, to vary the predetermined duration of the output signal.

In another embodiment the apparatus includes a number of range circuits each producing electrical changes in response to particles within a particular range of particle sizes in the particulate system. The speed-up circuit in this embodiment is coupled to each of the range circuits for varying, in a predetermined manner, the proportional relationship between the electrical changes in the range circuits and the individual particles size, for increasing the speed at which the particle dividing size is ascertained.

BRIEF DESCRIPTION OF THE DRAWINGS

FIG. 1 is a simplified block diagram of the speed-up circuit of this invention shown incorporated into a portion of FIG. 6 of the patent which is incorporated by reference;

FIG. 3 is a more detailed block diagram of another embodiment of the speed-up circuit shown in FIG. 1;

FIG. 6 is a schematic diagram of the variable oscillator shown in FIG. 5.

DETAILED DESCRIPTION OF THE DRAWINGS

Figure 2:
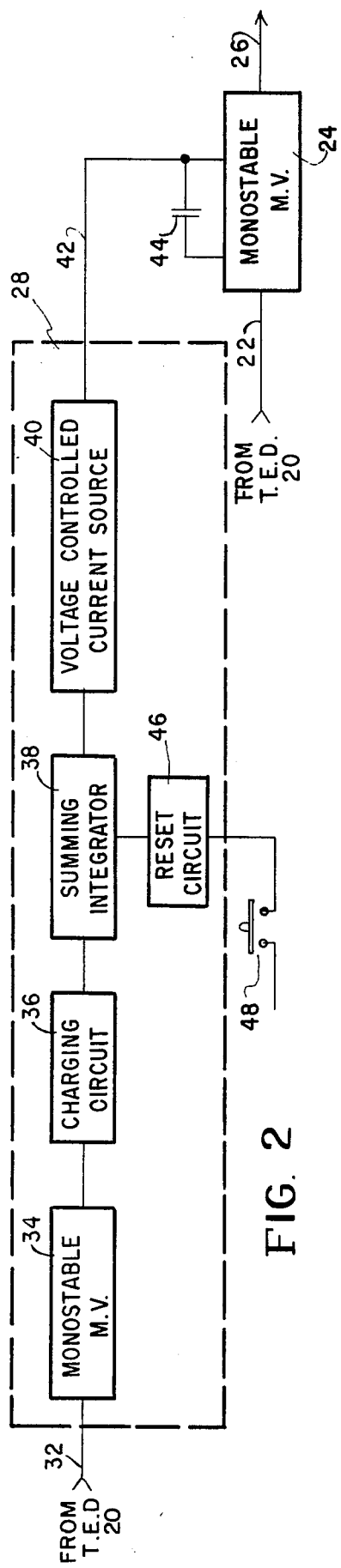
FIG. 2 is a more detailed block diagram of one embodiment of the speed-up circuit shown in FIG. 1.

In this application when a circuit corresponds to a circuit in the incorporated patent, the circuit number in the incorporated patent, in parentheses and followed by a prime, will be cited in at least one instance when identifying the circuit in this application in order to simplify cross-referencing.

Signal producing means 10 (30') in FIG. 1 can be assumed to consist of a Coulter Counter of some type. Particles in a particulate system, when coupled to signal producing means 10, will cause a succession of pulses to be developed at conductor 12, (88') each pulse being proportional to the size of the particle which produced it. The particle pulses are coupled via conductor 12 to the low threshold circuit 14 (94') in delayed precision pulse shaping means 16 (36'). Low threshold circuit 14 is set at a level which does not respond to electrical noise. This is quite close to the base line of the particle-produced pulse signal waveform, representing substantially the smallest practical particle which will be detected. Any signal which exceeds this low threshold will cause a threshold pulse at 18 (95') which will have its trailing edge detected in the trailing edge detector 20 (96'). Trailing edge detector 20 produces a small pip or trigger pulse that is coupled via conductor 22 (97') to variable period monostable multivibrator 24. Variable period monostable multivibrator 24 responds to this pip or trigger pulse to develop an output signal at conductor 26 (113', 114') of fixed amplitude and predetermined duration.

A counting/timing control circuit 28 is also shown in FIG. 1. Counting/timing circuit 28 has an output connected to multivibrator 24 via conductor 30, and will, in the counting circuit version only, have an input coupled to conductor 22 via conductor 32. The counting circuit version of counting/timing circuit 28 upon apparatus initiation, will count the number of trigger pulses coupled from trailing edge detector 20 and will develop a counting signal which varies between a first and second level in response to the number of trigger pulses counted. The varying counting signal is coupled to a voltage controlled current source 40 (shown in greater detail in FIGS. 2, 3 and 4) in counting circuit 28 which is coupled to variable period monostable 24, via conductor 30 for varying the predetermined duration of the output signal at conductor 26 between a first and second predetermined duration in accordance with the level of the counting signal.

For a more detailed explanation of the purpose and operation of the delayed precision pulse shaping means (36') in the incorporated patent, and for a more detailed explanation of the entire apparatus, reference is made to the patent incorporated by reference. However, for purposes of a more clear understanding of this application some explanation of the circuitry shown and described in the incorporated patent and operatively associated with the speed-up circuit is in order. In the original apparatus shown in the incorporated patent monostable (98') actuated P.E.S. 92' for a preset period of time in response to each particle pulse having an amplitude greater than the low threshold amplitude. The signal passed by P.E.S. (92') caused a charge accumulation in the accumulation devices which was proportional to the amplitude and duration of the signal from P.E.S. (92'). As the duration of the signal was fixed, the apparatus developed charges therein which were proportional only to the signal amplitude and therefor proportional to the size of each individual particle.

In the apparatus shown and described in this application, monostable multivibrator 24 is coupled to P.E.S. (92') and replaces monostable multivibrator (98'). By varying the duration of the output signal from monostable multivibrator 24 and providing a longer duration when the apparatus is initialized and the first particle pulses received, then when the latter particle pulses are received, greater weight will be given to the size of the initial particles sensed in the particulate system. This, occurs because the signals coupled through P.E.S. (92') will be coupled therethrough for a longer period of time, allowing more charge to be accumulated in the accumulating devices in response to the first particles sensed than the latter particles, and allowing the apparatus accumulating devices to move away from a state of zero charge more rapidly then heretofore possible.

Referring to FIG. 2 there is shown a more detailed block diagram of the counting version of the counting/timing circuit 28 in FIG. 1. The small trigger pulses developed by trailing edge detector 20 are coupled to a monostable multivibrator 34 in counting/timing circuit 28 via conductor 32. Each trigger pulse causes monostable multivibrator 34 to develop an output pulse of fixed amplitude and duration which is coupled to charging circuit 36. Charging circuit 36 converts the pulse coupled from monostable multivibrator 34 to a fixed charge which is coupled to a summing integrator 38. Summing integrator 38 will accumulate each charge and develop a counting voltage which varies in accordance with the number of charges accumulated. In the preferred embodiment, summing integrator 38 will develop a counting voltage which varies from approximately zero volts with no trigger pulses counted, to 10 volts with the first ten thousand trigger pulses or particles counted. This counting voltage is coupled from summing integrator 38 to a duration control circuit which, in this embodiment is a voltage controlled current source 40.

Voltage controlled current source 40 can for example be a Howland current pump such as is shown and described in "Applications Manual for Computing Amplifiers for Modeling, Measuring, Manipulating and Much Else", Philbrick Researches, Inc. 1966. Voltage controlled current source 40 will vary the amount of output current it supplies in accordance with the amplitude of the input voltage. The output of voltage control current source 40 is coupled via conductor 42 to one terminal of capacitor 44 in monostable multivibrator 24. Capacitor 44 is the duration determining component in monostable multivibrator 24. When monostable 24 is triggered via a trigger pulse at conductor 20 and develops an output signal at conductor 26, capacitor 44, which is in a discharged state, will begin to charge. Capacitor 44 will charge at a rate determined by its capacitance and the applied current. When capacitor 44 charges to a predetermined voltage, monostable multivibrator 24 will reset, terminating the output signal at conductor 26. By limiting the current to capacitor 44, the duration of the output signal developed at conductor 26 by monostable 24 can be varied.

In the embodiment shown in FIG. 2 with a low counting voltage coupled to the input of voltage controlled current source 40, resulting from receipt of very few, if any, particle pulses, the amount of current coupled from voltage controlled current source 40 to capacitor 44 via conductor 42 is quite small. Monostable 24 will maintain an output signal at conductor 26 for a long period of time in response to a trigger pulse at conductor 20 because of the slow charging of capacitor 44. As more particle pulses are received, and as the counting voltage coupled to voltage controlled current source 40 increases, more current is allowed to flow via conductor 42 to capacitor 44, thus increasing the charging rate of capacitor 44 and decreasing the duration of the output signal at conductor 26. In the preferred embodiment the duration of the output signal at conductor 26 can vary by a ten to one ratio. For example, when apparatus operation is initiated, the duration of the output signal at conductor 26 will be 40 microseconds in response to each trigger pulse. After the first 10,000 particles have been detected, the duration of the output signal at conductor 26 will have decreased to 4 microseconds in response to each trigger pulse.

A reset circuit 46 is coupled to summing integrator 38 for discharging the counting voltage accumulated in summing integrator 38. Reset circuit 46 may be actuated via a push-button 48 which may, for example, be a pair of additional contacts on the apparatus start switch. By resetting the summing integrator 38 to a zero or reference level, the speed-up circuit is conditioned to begin a new cycle. That is, it will now cause monostable multivibrator 24 to maintain its output signal for a greater period of time than the output signal would be maintained after receipt of 10,000 pulses, thus allowing greater charge accumulation in response to the first 10,000 particles than in response to the later detected particles, and a resulting increase in the speed with which the apparatus ascertains the dividing particle size.

Referring to FIG. 3, there is shown an alternate embodiment of the circuit shown in FIG. 1. In this alternate embodiment circuits which are identical to those shown in FIG. 2 have identical reference numbers. The only difference between the circuitry shown in FIG. 2 and the circuitry shown in FIG. 3 is that in FIG. 3 one of either a clock oscillator 50, or a reference voltage source 52 are coupled to the summing integrator 38, instead of the charging circuit 36 and monostable 34 shown in FIG. 2. Clock oscillator 50 is of the type commonly known in the art which develops clock pulses at a predetermined repetition rate. The clock pulses when coupled to summing integrator 38 will cause a charge or timing signal to be accumulated in summing integrator 38. This charge or timing signal will vary from a first low level to a second higher level in a predetermined period of time determined by the repetition rate of the clock pulses from clock oscillator 50 and the charging and accumulation method employed in summing integrator 38. In an alternate embodiment of FIG. 3, reference voltage 52 is coupled to summing integrator 38 instead of clock oscillator 50. Reference voltage 52 will supply a fixed voltage to summing integrator 38 causing a charge or timing signal to be accumulated in summing integrator 38 whose amplitude is proportional to the charging constants of the circuitry used in summing integrator 38, the amplitude of the reference voltage and the period during which the reference voltage is present. In the preferred embodiment the timing signal will reach its maximum amplitude in approximately eight seconds. A further explanation of the operation of the circuitry shown in FIG. 3 will not be provided as operation of the remaining circuits is fully explained with reference to FIG. 2.

Figure 4:
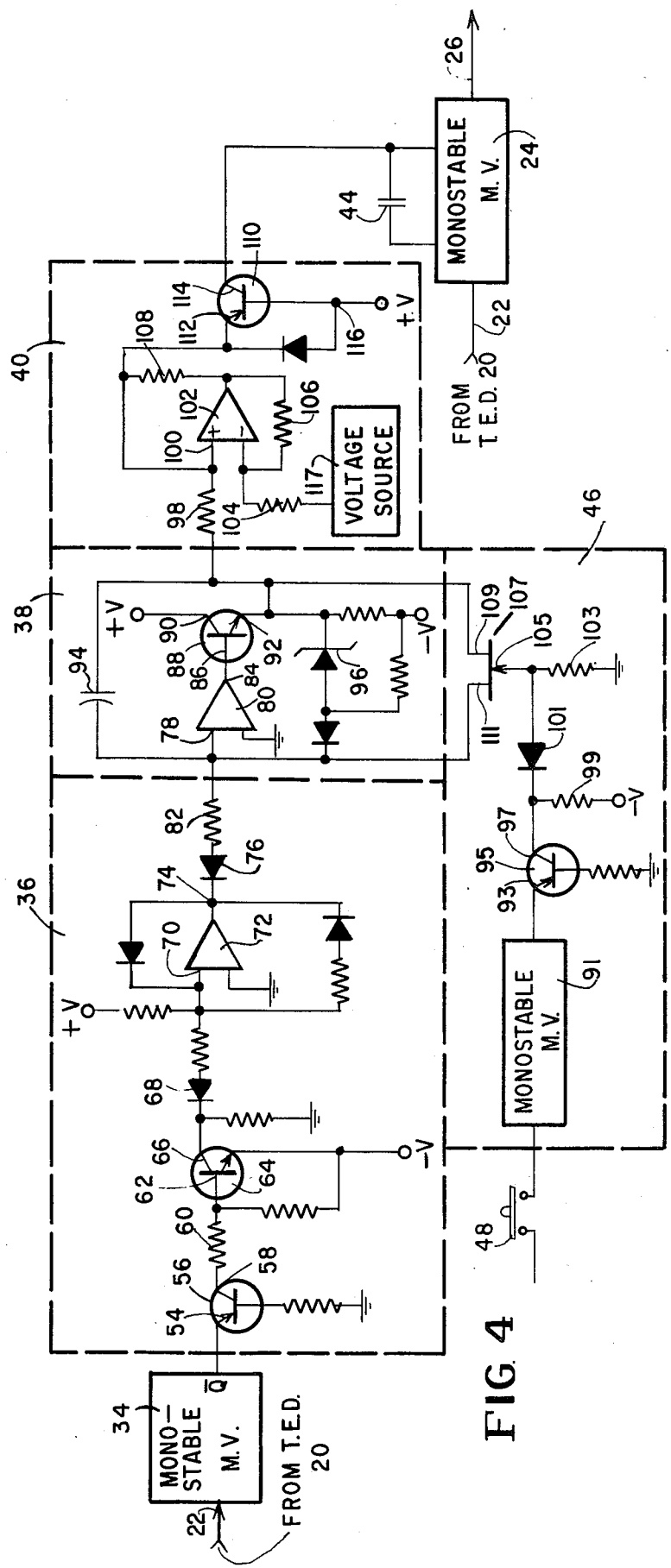
FIG. 4 is a schematic diagram of the apparatus shown in FIG. 2.

Referring to FIG. 4, there is shown a detailed schematic diagram of circuitry employed in FIG. 2. Each trigger pulse developed by trailing edge detector 20 is coupled to monostable multivibrator 34 via conductor 32 causing the $\overline{Q}$ output of monostable 34 to go low or to a "zero" state. This low or zero state is coupled to emitter 54 of transistor 56 in charging circuit 36, rendering transistor 56 non-conductive and terminating the voltage at collector 58. When transistor 56 is rendered non-conductive the voltage coupled from collector 58 of transistor 56 through resistor 60 to base 62 of transistor 64 is removed, causing transistor 64 to become non-conductive. With transistor 64 non-conductive diode 68 coupled to collector 66 of transistor 64 will become reverse biased. When diode 68 is reverse biased, the voltage at input 70 of amplifier 72 will become more positive causing the output 74 to become more negative. As output 74 becomes increasingly negative, diode 76 will become forward biased allowing current to flow out of input 78 of amplifier 80 in summing integrator 38, through resistor 82 and diode 76. The current flowing out of input 78 of amplifier 80 will cause the output 84 of amplifier 80 to become more positive. Output 84 is coupled to base 86 of transistor 88. As the output becomes more positive it will cause transistor 88 to conduct and couple a positive voltage from collector 90 to emitter 92. The positive voltage at emitter 92 will cause capacitor 94, coupled between emitter 92 of transistor 88 and input 78 of amplifier 80, to begin charging. Capacitor 94 will continue charging for the period that transistor 88 is rendered conductive. Transistor 88, of course, is conductive for the period of time that monostable 34 develops a zero at its $\overline{Q}$ output, Zener diode 96, coupled to emitter 92 of transistor 88 limits the maximum voltage to which capacitor 94 can be charged. In the preferred embodiment, zener diode 96 will limit the voltage developed across capacitor 94 to 10 volts. The voltage developed across capacitor 94 is coupled through resistor 98 in voltage controlled current source 40 to positive input 100 of amplifier 102.

As previously noted, voltage controlled current source 40 is a Howland type current pump whose output current is proportional to the amount of input voltage. In the embodiment shown in FIG. 4, amplifier 102, resistors 98, 104, 106 and 108 comprise the Howland circuit. Transistor 110 has its emitter 112 coupled to input terminal 100 of amplifier 102 and its collector 114 coupled to one terminal of capacitor 44 in monostable 24. Transistor 110 acts only to prevent overcharging of capacitor 44 by limiting the maximum voltage which can be developed across capacitor 44 to the voltage coupled to base 116 of transistor 110. A minimum current can be established by using a negative reference voltage source 117 coupled to resistor 104. This would establish a maximum pulse width for monostable 24.

Reset circuit 46 includes a monostable multivibrator 91 coupled to one terminal of switch 48. The output on monostable 91 is coupled to emitter 93 of transistor 95. Collector 97 of transistor 95 is coupled to one terminal of resistor 99 and the cathode of diode 101. The anode of diode 101 is coupled to the junction of resistor and gate 105 of field effect transistor (FET) 107. Drain 109 of FET 107 is coupled to one terminal of capacitor 94 and source 111 of FET 107 is coupled to the other terminal of capacitor 94.

Operation of push button switch 48 will couple a voltage to monostable 91 causing it to change states and develop a "one" at its output. The one level signal is coupled to emitter 93 of transistor 95 rendering transistor 95 conductive and reducing the voltage at collector 97. The reduced voltage at collector 97 will forward bias diode 101 causing a voltage to be developed at the junction of resistor 103 and gate 105. This voltage will forward bias gate 105 rendering FET 107 conductive. When FET 107 is conductive is provides a short circuit across capacitor 94 via drain 109 and source 111, discharging capacitor 94.

Figure 5:
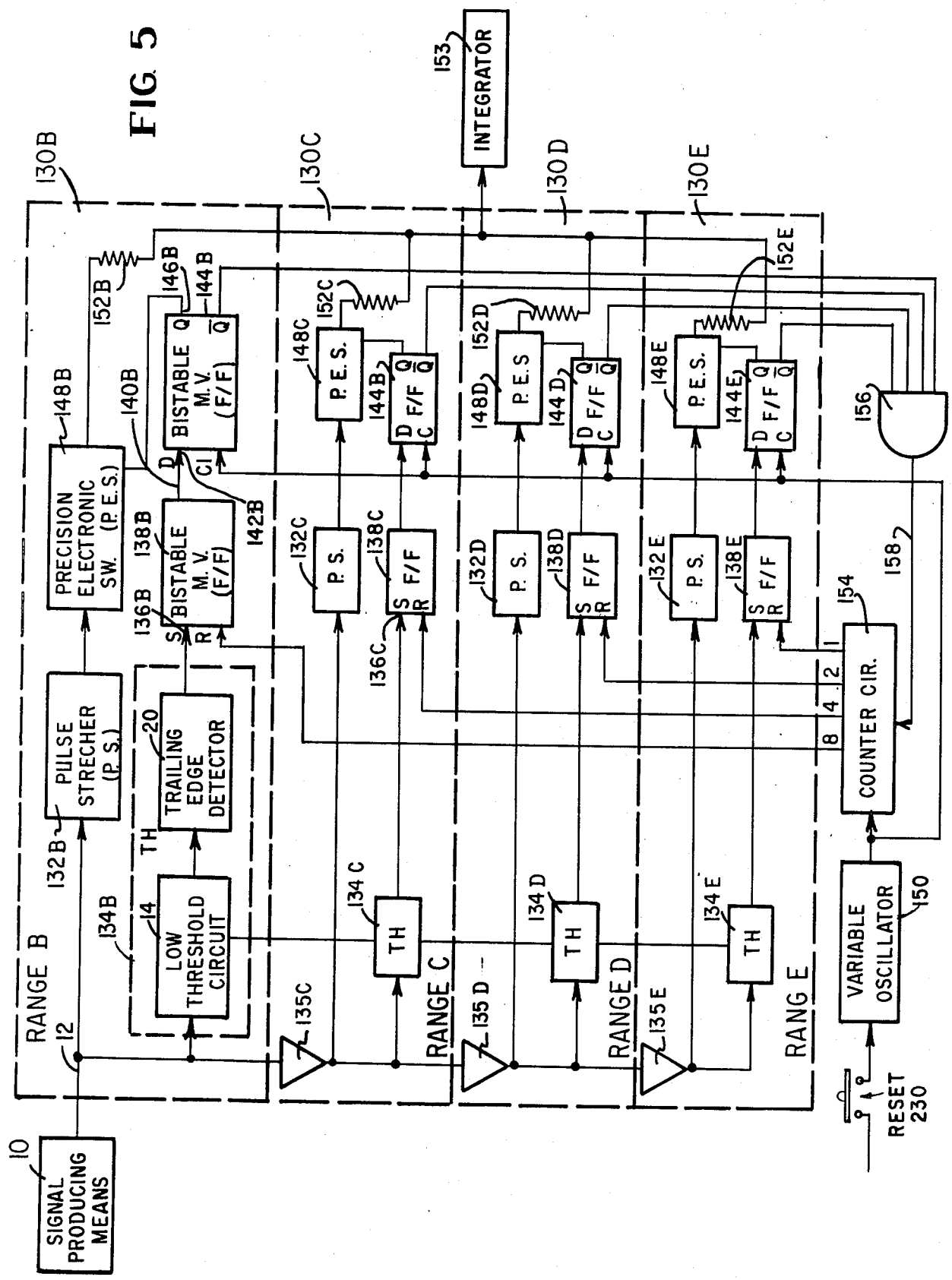
FIG. 5 is a block diagram of another embodiment of the speed-up circuit.

One embodiment of this apparatus must be capable of detecting a wide range of particle sizes in order to determine the dividing particle size in a particulate system. In order to perform such a function, the apparatus is divided into a number of range circuits shown within the dotted lines of FIG. 5 identified as 130B (280B'), 130C, 130D and 130E. Apparatus such as this has been shown and described in FIG. 9 of U.S. Pat. No. 3,557,352. If a number of ranges are to be employed in such an apparatus, each range must be closely correlated with all the other ranges in order to have each range recognize only particles within that range and to develop a charge which is proportional to the particle size in that range. If a speed-up circuit is to be employed which varies the proportional relationship between the charge accumulation and particle size dependent upon how many particles have been counted, or the period over which the apparatus has been operated, this speed-up circuit must also be very precise in order to insure that the variations within each range maintain a precise fixed ratio with respect to the variations in every other range. In the embodiments shown in FIGS. 1 through 4, a monostable multivibrator is employed. Because of the variations in tolerance of the timing capacitor in a monostable such a device is not acceptable for use in a multi-range apparatus such as shown in FIG. 5. A much more precise speed-up circuit must be provided.

Referring to FIG. 5, assume for example one of the largest detectable particles pass through signal producing means 10 causing a large particle pulse to be developed on conductor 12 and coupled to low threshold circuit 14 (34-L') in threshold circuit 134B, pulse stretcher (P.S.) 132B (90-B') and amplifier 135C. Amplifiers 135C, D and E in the preferred embodiment each have a gain of approximately 16, and are connected in series. This allows range B to respond for example to a one-volt signal while range E would be capable of responding to a signal which is 1/4096 of the one volt signal. If the pulse coupled to low threshold circuit 14 exceeds the threshold, low threshold circuit 14 will develop an output pulse which is coupled to trailing edge detector 20 (96-B') It will also inhibit operation of threshold circuits 134C, D and E. When the pulse from low threshold detector 14 terminates the trailing edge will cause trailing edge detector 20 to develop a threshold pulse which is coupled to the set input 136B of bistable multivibrator 138B. Bistable 138B will change states in response to the threshold pulse and develop a one at conductor 140B which is coupled to the D input 142B of bistable 144B. The Q output 146B of bistable 144 is coupled to a control input or gate of precision electronic switch (P.E.S.) (92-B'). A variable oscillator 150 has its output coupled to the clock input of bistable 144B. Upon receipt of a clock signal, following receipt of the one at the D input 142B of bistable 144B, bistable 144B will change states and develop a one at its Q output 146B which is coupled to (P.E.S.) 148B.

The pulse developed by signal producing means 10 is coupled via conductor 12 to pulse stretcher 132B as previously noted. P.S. 132B is operative in response to the pulse to develop an output pulse of substantially longer but fixed duration, having the same amplitude as its input pulse. This output pulse is coupled to the input of P.E.S. 148B. When the control input of P.E.S. 148B is high or in a one state it will allow the signal at the input of P.E.S. 148B to be coupled to the output. Thus the signal at the output will be present for so long as bistable 144B develops a one at its Q output 146B. The signal developed at the output of P.E.S. 148B is coupled through resistor 152B to integrator 153 causing integrator 153 to develop a charge proportional to the period of time that the signal is coupled from P.E.S. 148B.

The clock signal developed by variable oscillator 150 is also coupled to counter circuit 154. Counter circuit 154 in the preferred embodiment has four outputs, one for each of the four range circuits. Each output represents a different count of the number of pulses developed by variable oscillator 150. The four outputs are, one, two, four and eight counts. After an eight count the counter resets. Each output of divider circuit 154 is coupled to a reset input of bistable 138 in one of the range circuits. The eight output is coupled to the reset input of bistable 138B in the B range circuit, the four output is coupled to bistable 138C in the C range circuit, the two output is coupled to the reset input of bistable 138D in the D range circuit and the one circuit of counter circuit 154 is coupled to the reset input of bistable 138E in the E range circuit.

The $\overline{Q}$ output of bistable 144 in each of the four ranges is coupled to an input of AND gate 156. When the bistable 144 in each of the range circuits is at its normal non-activated state, the $\overline{Q}$ output will develop a one level signal. With the $\overline{Q}$ output of bistables 144B, C, D and E at a one level, AND gate 156 will develop a one at its output which is coupled via conductor 158 to the reset input of counter circuit 154 preventing counter circuit 154 from counting the pulses coupled from variable oscillator 150. When bistable 144 in any one of the range circuits is actuated, the $\overline{Q}$ output of bistable 144 will change from a one to a zero. The zero when coupled to an input of AND gate 156 will cause AND gate 156 to change states and develop a zero at its output which is coupled via conductor 158 to the reset input of divider circuit 154. This zero will terminate the reset at counter circuit 154 allowing the counter circuit to count subsequently received pulses from oscillator 150.

When a one is developed at the Q output 146B of bistable 144B as previously noted, a zero will be developed at the $\overline{Q}$ output of bistable 144B. Counter circuit 154 will now count eight pulses and will develop a one level at the eight output which is coupled to the reset input of bistable 138B in range circuit B. This one will cause bistable 138 to reset, forcing the output at conductor 140B, and therefore the D input 142B of bistable 144B to go to a zero state. Upon receipt of the next clock pulse from variable oscillator 150 at the clock input of bistable 144B, bistable 144B will reset causing the Q output 146B to revert to zero and the $\overline{Q}$ output to revert to a one. With a zero output at 146B, P.E.S. 148B will terminate the stretched pulse coupled through resistor 152B to integrator 153. With a one present at the $\overline{Q}$ output of bistable 144B AND gate 157 will again develop a one at its output which is coupled via conductor 158 to the reset input of counter circuit 154, resetting counter circuit 154 and maintaining a reset state.

In the preferred embodiment, resistor 152C is selected to pass one-eighth the current of resistor 152B, resistor 152D is selected to pass one-eighth the current of resistor 152C and resistor 152E is selected to pass one-eighth the current of resistor 152D. Furthermore, as previously noted, counter circuit 154 has four outputs with each output being twice the duration effectively of every other output. By this process, range B is adjusted to provide a range of 16 times the charging current as is provided by range C, range C is adjusted to provide a range of 16 times the charging current of range D and so on through range D and E. The precise proportional relationship between each range is established by this circuit such that selection of a dividing particle size in a particulate system can be made by this apparatus even though a plurality of ranges are used for discrete size ranges of the various particles in the particulate system.

In order to provide a speed-up circuit for the apparatus shown in FIG. 5, oscillator 150 is designed as a variable oscillator whose frequency starts at 25 KHZ when initialized and will build up to a frequency of 250 KHZ within a predetermined period of time. In the preferred embodiment oscillator 150 will go from 25 KHZ to 250 KHZ in approximately 8 seconds. It should be clear to those skilled in the art that the lower the frequency of variable frequency oscillator 150 the longer time period necessary for counter circuit 154 to develop a count signal at any one of its four outputs. This, of course, will result in a longer period of time during which the P.E.S. 148 in any one of the ranges B, C, D or E will be held on, and a greater period of charge accumulation in integrator 153.

Referring now to FIG. 6 variable oscillator 150 is shown in greater detail. The oscillator itself in FIG. 6 includes resistor 200, capacitor 202, resistors 204 and 206 and unijunction transistor (UJT) 208. These components form a unijunction oscillator. In operation, capacitor 202 charges towards a positive voltage via the current path supplied by resistor 200 until the voltage across capacitor 202 exceeds the turn on voltage of the emitter electrode 210 of UJT 208. UJt 208 will then turn on discharging capacitor 202 through base 212 and resistor 206 to ground. The timing between each turn on of the UJT 208, which is the frequency or repetition rate of the oscillator is determined by the charge characteristics of resistor 200 and capacitor 202. The output pulse developed by oscillator 150 is developed across resistor 206 as capacitor 202 discharges. The length of the output pulse will be determined by the discharge characteristics of capacitor 202 and resistor 206, and the turn off characteristics of UJT 208. The output pulse developed across resistor 206 is coupled through biasing diodes 214 and 216 to base 218 of transistor 220. Transistor 220 amplifies and limits the output pulse in order to improve its square-wave shape, and limits the maximum amplitude in the preferred embodiment to 5 volts. The amplified output pulse is developed at collector electrode 222 and coupled to counter circuit 154 and the clock inputs of bistables 144B, C, D and E.

The circuit for varying the repetition rate of the unijunction oscillator includes a pushbutton switch 230' having one terminal coupled to supply potential V1 and the other terminal coupled to the anode of diode 232. The cathode of diode 132 is coupled to the input of amplifier 234, one terminal of resistor 236 and one terminal of capacitor 238. The output of amplifier 234 is coupled to the anode of a zener diode 236 and the cathode of zener diode 236 is coupled to base electrode 238 of transistor 240. Collector 242 of transistor 240 is coupled to the junction of resistor 200 and capacitor 202, and emitter 244 of transistor 240 is coupled through resistor 246 to the positive supply terminal.

Pushbutton 230 can be a separated pushbutton or it can be a pair of contacts on the start switch for the entire apparatus. To initialize the speed-up circuit pushbutton 230 is depressed coupling a positive voltage V1 through diode 232 to capacitor 238 causing capacitor 238 to discharge. When pushbutton 230 is released, capacitor 238 will begin to charge to a voltage V1–V2 via resistor 236. As the voltage at the junction of capacitor 238 and 236 decreases towards V2, the input to amplifier 234 will also decrease or become more negative. Amplifier 234 in the preferred embodiment is a unity gain amplifier which is noninverting. Its output therefore will become more negative as its input becomes more negative. As the output of amplifier 234 becomes more negative, it will cause zener diode 236 to break down and conduct, drawing base current from base 238 of transistor 240. When base current is drawn, transistor 240 will begin conducting thus providing a second current path for charging capacitor 202 through resistor 246, emitter 244 and collector 242. This additional current path will allow capacitor 202 to more rapidly charge to the turn on voltage of UJT 208, thus increasing the frequency or repetition rate of the oscillator. As capacitor 238 continues to charge towards the more negative voltage V2, the input and output of amplifier 234 will continue to become more negative, further increasing the conductivity of transistor 240 and increasing the speed at which capacitor 202 approaches the charge which will cause UJT 208 to conduct and develop the output pulse. The oscillator will continue to increase in frequency until such time as transistor 240 is rendered fully conductive. At that time, the oscillator will maintain a constant output frequency until such time as reset button 230 is again depressed and capacitor 238 is again discharged.

As can be seen, the combinations which may be formed are many and the embodiments described are only a few of the more practical and simple and applicable to commercial apparatus. For a person skilled in the art to construct one of the combinations not specifically described would be a trivial rearrangement of the circuit functions of the invention, and would not constitute a departure from the scope thereof as defined in the appended claims.

What it is desired to be secured by Letters Patent of the United States is:

1. In an apparatus for ascertaining that particle size, within a particulate system, above and below which size predetermined fractions of the total mass of the system are respectively included, said particle size being the dividing size between fractions, wherein the apparatus includes means operative upon initiation to move said particulate system in a fluid medium relative to sensing means responsive to movement of individual particles to produce electrical changes in said apparatus proportional respectively to the size of individual particles, and wherein said apparatus includes means operative to ascertain said particle size in response to said electrical changes, the improvement comprising, speed-up circuit means operative to vary, in a predetermined manner, the proportional relationship between said electrical changes in said apparatus and the individual particle size for increasing the speed at which said particle size is ascertained.

2. The apparatus of claim 1 wherein said speed-up circuit means is operative upon initiation of said apparatus.

3. The apparatus of claim 1 wherein said speed-up circuit varies the proportional relationship by producing greater electrical changes during a first period of operation than during the second subsequent period of operation.

4. The apparatus of claim 1 wherein said speed-up circuit includes control circuit means operative in response to one of the number of individual particles moved relative to said sensing means and the period during which said electrical changes occur to vary the proportional relationship, in said predetermined manner, between said electrical changes in said apparatus and said particle size.

5. The apparatus of claim 1 wherein said electrical changes are electrical pulses proportional to said individual particle size, and wherein said speed-up circuit means includes control circuit means operative in response to one of the number of individual particles moved relative to said sensing means and the period during which pulses occur, to vary, in a predetermined manner, the electrical pulses.

6. The apparatus of claim 5 wherein the speed-up circuit includes, pulse generation means operative in response to particular ones of said individual particles moving relative to said sensing means to develop output signals of fixed amplitude and predetermined duration, said control circuit means being coupled to said pulse generation means and operative in response to one of the number of individual particles moved relative to said sensing means and the period during which electrical pulses occur, to vary, in a predetermined manner, the duration of said output signals, said electrical changes varying in accordance with said variations in said output signals.

7. In an apparatus for ascertaining that particle size, within a particulate system, above and below which size predetermined fractions of the total mass of the system are respectively included, said particle size being the dividing size between fractions, and which includes a threshold circuit operative to develop a first signal in response to passage through said apparatus of each individual particle in excess of a particular size, a speed-up circuit including in combination, first circuit means coupled to said threshold circuit means and operative in response to each first signal to develop an output signal of fixed amplitude and predetermined duration, and second circuit means coupled to said first circuit means and operative in response to one of the number of first signals received and the period during which said first signals are received to vary the duration of said output signal.

8. The apparatus of claim 7 wherein said first circuit means is a monostable multivibrator operative in response to each first signal coupled thereto to develop an output signal of fixed amplitude and predetermined duration.

9. The apparatus of claim 7 wherein said second circuit means includes, counting means coupled to said first circuit means and operative to develop a counting signal which varies in accordance with said first signals received, and duration control means coupled to said counting means and said first circuit means and operative in response to said counting signal to vary said predetermined duration of said output signal.

10. The apparatus of claim 9 wherein said counting means includes summing circuit means operative to count said first signals and to develop said counting signal, said counting signal varying between a first and second level in response to the number of first signals received, said duration control means being operative in response to said counting signal varying between said first and second level to vary said predetermined duration between a first and second predetermined duration.

11. The apparatus of claim 10 wherein said speed-up circuit further includes reset circuit means coupled to said summing circuit means for resetting said counting signal to said first level.

12. The apparatus of clailm 7 wherein said second circuit includes, timing means operative to develop a timing signal, and duration control means coupled to said timing means and operative in response to said timing signal to vary said predetermined duration of said output signal.

13. The apparatus of claim 12 wherein said timing means includes summing circuit means operative in response to passage of a predetermined time period to develop said timing signal, said timing signal varying between a first and second level in response to passage of said predetermined time period, said duration control means being operative in response to said timing signal varying between said first and second level to vary said predetermined duration between a first and second predetermined duration.

14. The apparatus of claim 13 wherein said timing means includes, clock means for developing a predetermined number of clock signals in said predetermined time period, said summing circuit means being coupled to said clock means and operative in response to said clock signals developed during said predetermined time period to develop said timing signal.

15. The apparatus of claim 13 wherein said timing means includes, reference signal means for developing a reference signal, said summing circuit means being coupled to said reference signal means and operative in response to said reference signal to develop said timing signal.

16. The apparatus of claim 13 wherein said speed-up circuit further includes, reset circuit means coupled to said summing circuit means for resetting said counting signal to said first level.

17. The apparatus of claim 7 wherein said first circuit means includes monostable means operative in response to each first signal coupled thereto to develop an output signal of fixed amplitude and predetermined duration, said monostable means including charging means for charging to a particular level, said monostable means developing said output signal during said charging, said second circuit means including summing circuit means operative in response to one of the number of first signals received and the period during which said first signals are received, to develop a summing signal, said summing signal varying between a first and second level, duration control means coupled to said summing means and said monostable means and operative in response to said summing signal varying between said first and second level to vary the charging rate of said charging means whereby said output signal duration is varied, and reset means coupled to said summing means for resetting said summing signal to said first level.

18. The apparatus of claim 17 wherein said duration control means is a variable current source.

19. The apparatus of claim 17 wherein said charging means is a capacitor.

20. The apparatus of claim 7 wherein said summing means is an integrator.

21. An apparatus for ascertaining that particle size within a particulate system, above and below which size predetermined fractions of the total mass of the system are respectively included, said particle size being the dividing size between fractions, wherein said apparatus includes means operative upon initiation to move said particulate system in a fluid medium relative to sensing means responsive to movement of individual particles to produce electrical changes in one of a plurality of range circuits in said apparatus, said changes being proportional respectively to the size of said individual particles, and wherein said apparatus includes means operative to ascertain said particle size in response to said electrical changes, the improvement comprising, speed-up circuit means coupled to each of said range circuits and operative to vary, in a first predetermined manner, the proportional relationship between said electrical changes in said range circuits and the individual particles size for increasing the speed at which said particle size is ascertained.

22. The apparatus of claim 21 wherein each of said range circuits includes a threshold circuit means operative to develop a first signal in response to passage through said apparatus of each individual particle in excess of a particular size, said speed-up circuit further including variable oscillator means for developing second signals, said second signals varying from a first frequency to a second frequency in a predetermined period after initiation, counter circuit means coupled to said variable oscillator means and operative to count said second signals and develop a counting signal for particular counts, said threshold circuit means being coupled to said counter circuit means and operative in response to a counting signal for a particular count to terminate said first signal.

23. The apparatus of claim 22 further including gate means coupled to said threshold circuit means and said counter circuit means and operative in response to said first signal to allow said counter circuit means to count.

24. The apparatus of claim 23 wherein said gate means includes, AND gate means having an input coupled to said threshold means in each range circuit and an output coupled to said counter circuit means.

25. The apparatus of claim 22 wherein said threshold circuit means is further coupled to said variable oscillator means and operative in response to passage through said apparatus of individual particles in excess of a particular size and a second signal following said passage to develop said first signal.

26. The apparatus of claim 22 wherein said threshold circuit means includes, low threshold circuit means operative to develop a trigger pulse in response to individual particles in excess of a particular size and bistable means coupled to said low threshold circuit means and operative in response to said trigger pulse to develop said first signal.

* * * * *

UNITED STATES PATENT AND TRADEMARK OFFICE
CERTIFICATE OF CORRECTION

PATENT NO. : 3,894,221
DATED : July 8, 1975
INVENTOR(S) : DAVID R. FIGUEROA, EDWARD NEAL DOTY and ANTHONY MARINO It is certified that error appears in the above-identified patent and that said Letters Patent are hereby corrected as shown below:

Column 1, line 61, delete "to" (second occurrence) and substitute "both".

Column 3, line 66, before "accumulation" delete "the".

Column 6, line 10, delete zero (second occurrence) and substitute -- "zero" --.

Column 7, line 7, delete one (second occurrence) and substitute -- "one" --.

Column 7, line 66, delete one and substitute --"one" --.

Column 8, line 5, delete one and substitute -- "one" --.

Column 8, line 7, delete one and substitute -- "one" --.

Column 8, line 16, delete one and substitute -- "one" --.

Column 8, line 19, delete one and substitute -- "one" --.

Column 8, line 38, delete "circuit" (second occurrence) and substitute -- output --.

Column 8, line 44, delete "non-activated" and substitute --nonactivated--.

UNITED STATES PATENT AND TRADEMARK OFFICE
CERTIFICATE OF CORRECTION

PATENT NO. : 3,894,221
DATED : July 8, 1975
INVENTOR(S) : DAVID R. FIGUEROA, EDWARD NEAL DOTY and ANTHONY MARINO It is certified that error appears in the above-identified patent and that said Letters Patent are hereby corrected as shown below:

```
Column 8, line 45, delete  one   and substitute --"one"--.

Column 8, line 46, delete  one   and substitute --"one" --.

Column 8, line 47, delete  one   and substitute --"one" --.

Column 8, line 52, delete  one   and substitute --"one"--.

Column 8, line 52, delete  zero  (first occurrence) and
                  substitute --"zero"--.

Column 8, line 52, delete  zero (second occurrence) and
                  substitute --"zero"--.

Column 8, line 54, delete  zero  and substitute --"zero"--.

Column 8, line 56, delete  zero  and substitute --"zero"--.

Column 8, line 60, delete  one   and substitute --"one"--.

Column 8, line 61, delete  zero  and substitute --"zero"--.

Column 8, line 63, delete  one   and substitute -- "one"--.

Column 8, line 65, delete  one   and substitute --"one"--.
```

UNITED STATES PATENT AND TRADEMARK OFFICE
CERTIFICATE OF CORRECTION

PATENT NO. : 3,894,221

DATED : July 8, 1975

INVENTOR(S) : DAVID R. FIGUEROA, EDWARD NEAL DOTY and ANTHONY MARINO

It is certified that error appears in the above-identified patent and that said Letters Patent are hereby corrected as shown below:

Column 9, line 1, delete zero and substitute --"zero"--.

Column 9, line 4, delete zero and substitute --"zero"--.

Column 9, line 5, delete one and substitute --"one"--.

Column 9, line 5, delete zero and substitute --"zero"--.

Column 9, line 7, delete one and substitute --"one"--.

Column 9, line 9, delete one and substitute --"one"--.

Column 9, line 54, delete "UJt" and substitute --UJT--.

Column 10, line 20, delete "separated" and substitute --separate--.

Signed and Sealed this sixteenth Day of March 1976

[SEAL]

Attest:

RUTH C. MASON
Attesting Officer

C. MARSHALL DANN
Commissioner of Patents and Trademarks